United States Patent [19]

Frick et al.

[11] 3,904,699

[45] Sept. 9, 1975

[54] PROCESS FOR THE PREPARATION OF METHYL BUTENOL

[75] Inventors: Heinrich Frick; Claude Fürbringer, both of Riehen, Switzerland

[73] Assignee: Hoffmann-La Roche Inc., Nutley, N.J.

[22] Filed: Apr. 23, 1973

[21] Appl. No.: 353,836

[30] Foreign Application Priority Data
May 9, 1972  Switzerland.......................... 6866/72

[52] U.S. Cl. .............. 260/640; 203/91; 260/643 D; 260/654 H
[51] Int. Cl.$^2$.......................................... C07C 29/00
[58] Field of Search...................... 260/640; 203/91

[56] References Cited

UNITED STATES PATENTS

| | | | |
|---|---|---|---|
| 2,382,031 | 8/1945 | Soday | 260/640 |
| 2,423,599 | 7/1947 | Kamlet | 260/640 |
| 2,475,364 | 7/1949 | van de Griendt et al. | 260/640 |

*Primary Examiner*—Joseph E. Evans
*Attorney, Agent, or Firm*—Samuel L. Welt; Jon S. Saxe; William H. Epstein

[57] ABSTRACT

A process for producing 2-methyl-3-buten-2-ol (methyl butenol) in high yields from 1-chloro-3-methyl-2-butene or 3-chloro-3-methyl-1-butene or mixtures thereof by hydrolysis in the absence of an alkali.

2 Claims, No Drawings

PROCESS FOR THE PREPARATION OF METHYL BUTENOL

BACKGROUND OF THE INVENTION

In the past, 2-methyl-3-buten-2-ol was prepared from isoprene (2-methyl-butadiene-1,3) by first treating isoprene with hydrogen chloride to form a mixture of 1-chloro-3-methyl-2-butene and 3-chloro-3-methyl-1-butene and then subjecting the resulting product to hydrolysis. This process suffers from the disadvantage that after separating the methyl butenol from the hydrolysate, spent alkali remains beind. This spend alkali cannot be recovered. Furthermore, this spent alkali presents a disposal problem.

SUMMARY OF THE INVENTION

In accordance with this invention, it has been found that when either 1-chloro-3-methyl-2-butene or 3-chloro-3-methyl-1-butene or a mixture thereof is subjected to aqueous hydrolysis in the absence of alkali, and the hydrolysis product is distilled at temperatures of at most 30°C. under reduced pressure, 2-methyl-3-buten-2-ol is produced in the distillate in high yields. Furthermore, the residue remaining after distillation is aqueous hydrochloric acid which can be recovered and utilized, thereby eliminating any disposal problem.

The process of this invention is especially advantageous in a process where isoprene is utilized as a starting material in the production of 2-methyl-3-buten-2-ol. This is true since the first step of this process involves reacting isoprene with hydrogen chloride to produce a mixture of 1-chloro-3-methyl-butene and 3-chloro-3-methyl-1-butene. This mixture is then subjected to water hydrolysis in the absence of an alkali and distillation at a temperature of at most 30°C. to produce 2-methyl-3-buten-2-ol as the distillate. By being able to recover the hydrogen chloride as the distillation residue, one can reutilize this hydrogen chloride in this process to chlorinate additional isoprene.

DETAILED DESCRIPTION OF THE INVENTION

In accordance with the process of this invention 2-methyl-3-buten-2-ol is produced by hydrolyzing 1-chloro-3-methyl-2-butene or 3-chloro-3-methyl-1-butene or a mixture thereof by the addition of water without the addition of any base such as an alkali, and thereafter distilling off the 2-methyl-3-buten-2-ol from the hydrolyzed reaction mixture at a temperature of at most 30°C. and under reduced pressure.

Both 1-chloro-3-methyl-2-butene and 3-chloro-3-methyl-1-butene are old compounds. In accordance with this invention, either one of these compounds can be utilized advantageously in producing 2-methyl-3-buten-2-ol. On the other hand, in accordance with a preferred embodiment of this invention, a mixture of 1-chloro-3-methyl-2-butene and 3-chloro-3-methyl-1-butene is utilized to produce the 2-methyl-3-buten-2-ol.

In carrying out the hydrolysis reaction, temperature and pressure are not narrowly critical. This hydrolysis reaction can be carried out at room temperature and atmospheric pressure. On the other hand, elevated or reduced temperatures and pressures can be utilized. Generally, it is preferred to carry out this reaction at a temperature of from about 10° to 40°C. with temperatures of from about 20° to 30°C. being especially preferred. This hydrolysis reaction proceeds very quickly at room temperature. In fact, after a few minutes of stirring at room temperature, the bulk of the starting material has already been hydrolyzed. If desired, the mixture can be stirred for 40–60 minutes at room temperature to insure complete hydrolysis and high yields. In order to insure high yields, gas chromatography can be utilized to determine if all of the material has been hydrolyzed.

The hydrolysis reaction is carried out by treating the chloro-methyl butene starting material (which can be either 1-chloro-3-methyl-2-butene or 3-chloro-3-methyl-1-butene or a mixture thereof) with water in the absence of an alkali. In this regard, this hydrolysis reaction will be carried out at a pH of from about 0 to 5, with a pH of 0 to 2 being preferred. The amount of water utilized in this reaction is approximately from about 5 to 5,000 moles of water per mole of the chloro-methyl-butene starting material with from about 10 moles to about 500 moles of water per mole of said chloro-methyl-butene starting material being especially preferred.

After hydrolysis, the hydrolysate is expediently distilled at a temperature of at most 30°C. In carrying out this reaction, any temperature of from about 0° to about 30°C. can be utilized. Generally, it is preferred to carry out this distillation at a temperature of from 25° to 30°C. This distillation is carried out under vacuum or reduced pressure. Generally, in carrying out this distillation, a pressure of from about 100 to about 11 mmHg is utilized. In carrying out this distillation it is preferred to utilize a reduced pressure of from about 30 to about 11 mmHg. In accordance with a preferred embodiment of this invention, the hydrolysate is expediently distilled at 25° to 30°C. in a water-jet vacuum, the methyl butenol passing over azeotropically. The thus obtained already largely pure product can be further purified by shallow distillation in a partial vacuum.

In a particularly preferred embodiment of the present process, isoprene is utilized to produce a mixture of 1-chloro-3-methyl-2-butene and 3-chloro-3-methyl-1-butene. This mixture is then subjected to the process of this invention for producing 2-methyl-3-buten-2-ol. In reacting isoprene with hydrogen chloride to produce the mixture of 1-chloro-3-methyl-2-butene and 3-chloro-3-methyl-1-butene, any of the conditions conventional and well known in the art can be utilized to carry out this reaction. The hydrogen chloride which is obtained as the residue upon conversion of this mixture to methyl butenol and distillation can be regenerated and reutilized to react with additional isoprene to produce the mixture of chloro-methyl butene. The regeneration can be effected by concentration of the aqueous hydrochloric acid and subsequent distillation.

The following examples are illustrative but not limitative of this invention.

EXAMPLE 1 a. 76 g. of dry hydrogen chloride are introduced into 136 g. of isoprene in the course of 2 hours at −20°C. Thereafter, the mixture is stirred for 2 hours at 0°C. There are obtained 209–212 g. of a mixture containing 67% by weight 3-chloro-3-methyl-1-butene, 30% by weight 1-chloro-3-methyl-2-butene and 3% by weight isoprene.

b. The product obtained according to paragraph (a) is added in the course of 15 minutes with intensive stirring to 2,000 ml. of water at 20°C. The mixture is stirred for 40–60 minutes, the temperature rising to 28° to 30°C. The mixture is then distilled under 15 mmHg at an evaporation temperature of 28° to 30°C. (maximum bath temperature 40°C.). There are obtained 500 g. of a two-phase distillate. The distillation residue is extracted three times with a total of 600 ml. of methylene chloride. Thereafter, the distillate is extracted with the methylene chloride used in the extraction of the residue. The methylene chloride is fractionated. There are obtained 160 g. of a crude 2-methyl-3-buten-2-ol. The distillation yields a principle fraction of 135.5 g. which passes over at 38° to 48°C./70 mmHg. The total yield in serial batches (separate working up of the fractionated residues) is about 90 percent.

We claim:
1. A process for producing 2-methyl-3-buten-2-ol, comprising hydrolyzing a material selected from the group consisting of 1-chloro-3-methyl-2-butene, 3-chloro-3-methyl-1-butene or mixtures thereof with 5 to 5,000 moles of water per mole of said material in the absence of an alkali to form a mixture containing 2-methyl-3-buten-2-ol and distilling said mixture at a temperature of from 0° to 30°C under reduced pressure of at most about 100 mm Hg to obtain 2-methyl-3-buten-2-ol as the distillate.

2. The process of claim 1 wherein said distillation is carried out at a pressure of from 30 to 11 mmHg.

* * * * *